No. 695,964. Patented Mar. 25, 1902.
R. C. TAGGART.
DISPLAY RACK FOR HATS.
(Application filed May 2, 1901.)
(No Model.)
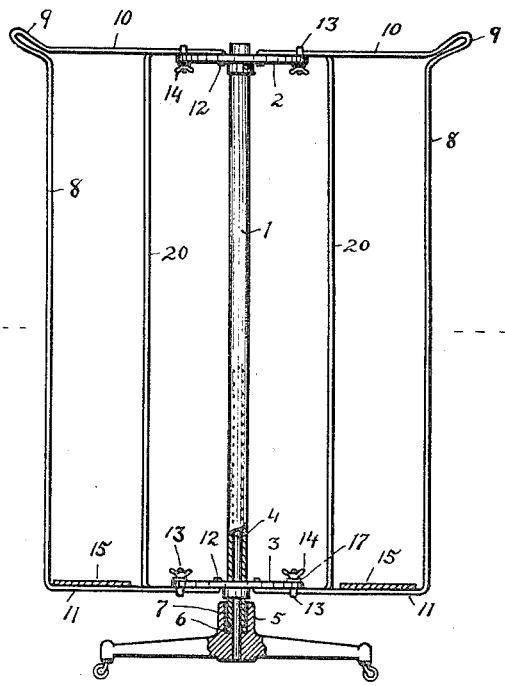
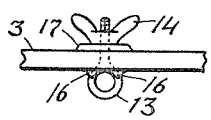
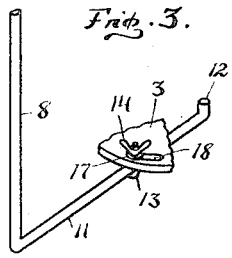
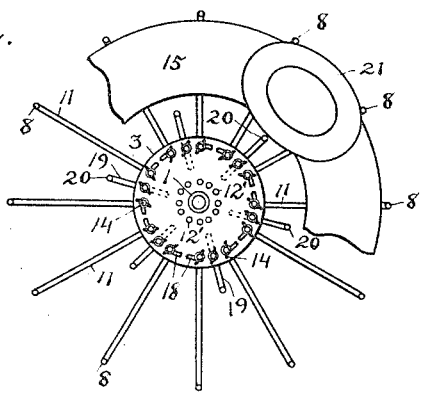
WITNESSES: T. W. Wilson, J. M. Burns.
Rollin C. Taggart, INVENTOR
BY W. J. Burns, ATTORNEY

UNITED STATES PATENT OFFICE.

ROLLIN C. TAGGART, OF TOLEDO, OHIO.

DISPLAY-RACK FOR HATS.

SPECIFICATION forming part of Letters Patent No. 695,964, dated March 25, 1902.

Application filed May 2, 1901. Serial No. 58,474. (No model.)

*To all whom it may concern:*

Be it known that I, ROLLIN C. TAGGART, a citizen of the United States, residing at Toledo, in the county of Lucas and State of Ohio, have invented certain new and useful Improvements in Display-Racks for Hats; and I do declare the following to be a full, clear, and exact description of the invention, such as will enable others skilled in the art to which it appertains to make and use the same, reference being had to the accompanying drawings, and to the numerals of reference marked thereon, which form a part of this specification.

My invention relates to improvements in display-racks for hats wherein a number of vertical rods are adjustably arranged in connection with a revoluble support; and the object of my improvement is to provide means for displaying hats and holding them in vertical ranks and to afford adjustment for the said rods.

I accomplish my object by the construction illustrated in the accompanying drawings, in which—

Figure 1 is a side elevation partly in section and showing several of the retaining-rods in position. Fig. 2 is an enlarged detail view showing the means for fastening the rods 20. Fig. 3 is an enlarged detail view showing the method of securing the rods 8, and Fig. 4 is a cross-section of Fig. 1 on the line X X.

Similar numerals of reference indicate corresponding parts throughout the several views.

The base 5 has a central socket 7 and a rigid stem 4 centrally projecting upward through said socket. The revoluble tube 1 fits over said stem and with its lower end ranging in said socket and resting upon the annular row of balls 6 at the base of said socket. Horizontal disks 2 and 3 are centrally arranged, respectively, near the ends of the tube 1, to which are attached the horizontal arms 10 and 11 of the outer rods 8 and the horizontal arms 19 of the inner rods 20. The inner ends of the arms 10 and 11 are turned vertically at right angles and rest in the perforations 12' made in the disks 2 and 3. Eyebolts 13 are arranged upon the arms 10 and 11 and pass through slots 18 in said disks. The said slots are elongated and range laterally relative to said arms. Washers 17 and thumb-nuts 14 are secured upon the projecting ends of the eyebolts, and by tightening the same the said arms are held firmly in place against the opposite sides of said disks. By loosening said thumb-nuts the outer rods 8 may be laterally adjusted to the positions desired and secured in the adjusted positions by retightening said thumb-nuts.

The inner rods 20 have horizontal arms 19, which pass between lugs 16 and through eyebolts 13, in which they are longitudinally adjustable. The eyebolts pass through perforations in said disks and are secured by washers 17 and thumb-nuts 14, as in the former instance.

Loops 9 may be formed at the junctures of the rods 8 and arms 10, upon which may be hung hats or other articles for display.

A circular platform 15 may be arranged to lie upon the arms 11 and in the circular space between the rods 8 and 20.

The hats 21 to be displayed are arranged one upon another in vertical ranks, the lowermost hat resting upon the platform 15, (or upon the arms 11 if no platform is used,) and the rods 8 are adjusted laterally and the rods 20 are moved inwardly or outwardly, according to the size of the hats forming the respective ranks.

Having described my invention, what I claim as new, and desire to secure by Letters Patent, is—

1. In a display-rack for hats, a vertical revoluble support having disks near its ends; a series of vertical outer rods having upper and lower horizontal arms connecting with said disks respectively, and being adapted to be swung laterally for the purpose of adjustment; a series of vertical inner rods having upper and lower horizontal arms connecting with said disks respectively, and being adapted to be moved inwardly or outwardly relative to said disks for the purpose of adjustment; and means for securing all of said horizontal arms in adjusted position to said disks, substantially as shown and described.

2. In a display-rack for hats, a vertical revoluble support having upper and lower disks; a series of vertical outer rods having upper and lower horizontal arms supported by said disks; a series of vertical inner rods having upper and lower horizontal arms supported by said disks; and a circular platform resting upon the lower arms of said outer rods, substantially as shown and described.

3. In a display-rack for hats, a vertical revoluble support having upper and lower disks; a series of vertical outer rods having projecting loops at their upper ends, and upper and lower horizontal arms supported by said disks; a series of vertical inner rods having upper and lower horizontal arms supported by said disks; and means for adjusting all of said horizontal arms relative to said disks, substantially as shown and described.

In testimony whereof I affix my signature in presence of two witnesses.

ROLLIN C. TAGGART.

Witnesses:
  B. J. LONG,
  FRANK W. LONG.